United States Patent [19]

Yamada et al.

[11] Patent Number: 4,933,109

[45] Date of Patent: Jun. 12, 1990

[54] FIBROUS WHITE ELECTRICALLY CONDUCTIVE MATERIAL AND A WHITE ELECTRICALLY CONDUCTIVE COATING COMPOSITION CONTAINING THE SAME

[75] Inventors: Koichi Yamada; Mitutosi Murase; Osamu Takagi, all of Ehime, Japan

[73] Assignee: Sumitomo Chemical Company, Limited, Osaka, Japan

[21] Appl. No.: 916,873

[22] Filed: Oct. 9, 1986

[30] Foreign Application Priority Data

Oct. 14, 1985 [JP] Japan .................. 60-228249
Nov. 21, 1985 [JP] Japan .................. 60-262220

[51] Int. Cl.$^5$ .............................. H01B 1/06
[52] U.S. Cl. ...................... 252/520; 252/518; 428/389; 428/403; 428/407; 428/379
[58] Field of Search ............... 252/518, 520; 428/375, 428/361, 403, 407, 379, 389, 386; 423/598, 608

[56] References Cited

FOREIGN PATENT DOCUMENTS

| | | |
|---|---|---|
| 0025583 | 9/1980 | European Pat. Off. . |
| 0130575 | 6/1984 | European Pat. Off. . |
| 56-114217 | 9/1981 | Japan . |
| 59-6235 | 1/1984 | Japan . |
| 59-6235 | 1/1984 | Japan . |
| 60-9005 | 1/1985 | Japan . |
| 60-12606 | 1/1985 | Japan . |
| 2169296 | 7/1986 | United Kingdom . |

*Primary Examiner*—Josephine Barr
*Attorney, Agent, or Firm*—Darby & Darby

[57] ABSTRACT

Fibrous white electrically conductive material and a coating composition containing the same. The material is made from fiber of alkali titanate $$aM_2O \cdot TiO_2 \cdot bH_2O$$

wherein M is alkali metal including Li, Na and K $$0 < a \leq 1/8.5$$

$$0 \leq b$$

which is coated with tin oxide (2–500 parts by weight every 100 parts by weight of the fiber). The material is applied to paper, plastics or rubber and gives high electrical conductivity thereto.

10 Claims, No Drawings

FIBROUS WHITE ELECTRICALLY CONDUCTIVE MATERIAL AND A WHITE ELECTRICALLY CONDUCTIVE COATING COMPOSITION CONTAINING THE SAME

This invention relates to a fibrous white electrically conductive material suitable for blending with paper, plastic or rubber in order to provide electrical conductivity. This invention particularly concerns a fibrous white electrically conductive tin oxide material having low specific volume resistivity and being superior in ability to provide electric conductivity per unit weight.

Furthermore, the invention provides a white electrically conductive coating composition excellent in electrical conductivity, which contains the fibrous material mentioned above.

Tin oxide powder is recently more familiar than electrical conductive powders of carbon black, silver, copper, aluminum and the like, in the field of antistatic plastics, coating composition and the like which requires white color tone, such as electrostatic copying paper. As is well known, an electrical conductivity-providing powdery agent is blended in a material such as paper, plastics rubber and the like. A large amount of the agent is needed so that adjacent powders at least are brought into contact each other, in order to obtain high electrical conductivity. When the powder is expensive, the use is limited. One of materials which is proposed to be able to form an electrically conductive circuit even in a small amount is tin oxide of acicular shape. Another material is an electrically conductive agent such as a fibrous material such as glass fiber or an organic high molecular material, which is coated with an electrically conductive material (Japanese Kokai 56-120519).

However, a smaller amount of the acicular tin oxide than powders is enough so far as an amount to be employed is concerned, but electric conductivity brought about is not satisfactory yet. An amount of the electrically conductive material is able to save, too, when the fibrous material coated with an electrically conductive material is used, but desired electric conductivity is hardly obtained because the electrically conductive material is easily peeled off from the substrate fibrous material when the fibrous material is blended with a material to which electric conductivity is given, such as paper, plastics, rubber and the like.

Another approach (Japanese Kokai 59-6235) is a white electrically conductive agent in which a tin oxide material is added to a fiber made from potassium titanate having the formula:

$K_2O.nTiO_2.mH_2O$ wherein n is a real number not greater than 8, m is zero or a real number not greater than 4.

The agent is good in white color tone and is able to somewhat better electric conductivity than an agent in which an electrically conductive material is coated on a fibrous material such as glass fiber, but is not satisfactory yet.

So far as a coating composition is concerned, fields of use are rapidly increasing in a vessel to reserve IC, various materials for electronics, construction materials such as a floor and a wall for a clean room and the like, which require to be in white or the other various colors and to have antistatic property. There are many proposals to this effect by using a coating composition which contains inorganic electrically conductive powders comprising mainly tin oxide, in place of carbon black, silver, copper and aluminum. However, these proposals are not economical, because a large amount of an electrically conductive material has to be incorporated in the coating composition in order to provide enough antistatic property. Furthermore, the coating composition gives a fatal difficulty, i.e., desired properties of resin component in the coating composition are lost.

After having been studying to develope and obtain a white electrically conductive material which has low specific volume resistivity and is superior in electrical conductivity-providing ability per unit weight, the present inventors find that the desired object is achieved when a specific amount of a tin oxide material is applied on a fibrous alkali titanate having a specific formula. Furthermore, the present inventors succeed in obtaining a coating composition which is not expensive and able to provide a coating which is excellent in white color tone, electrical conductivity and antistatic property, when the composition contains a specific amount of the tin oxide material above.

According to the present invention, a fibrous white electrically conductive material is provided wherein 2–500 parts by weight of tin oxide is coated on 100 parts by weight of a fiber made from alkali titanate having the formula

$aM_2O.TiO_2.bH_2O$ wherein M is alkali metal selected from the group consisting of Li, Na and K, $0 < a \leq 1/8.5$ and $0 \leq b$.

Furthermore, a white electrically conductive coating composition is provided, which comprises, every 100 parts by weight, 5–90 parts by weight of a fibrous white electrically conductive material defined above and 95–10 parts by weight of resin.

Alkali titanate from which a fiber is made has the formula

$a.M_2O.TiO_2.bH_2O$ wherein M is alkali metal selected from the group consisting of Li, Na and K, preferably K, $0 < a \leq 1/8.5$, preferably $1/13 \leq a \leq 1/9$, and $0 \leq b$, preferably $0 \leq b \leq 6$.

The fiber is $1\mu$–$1000\ \mu$ long, preferably $10$–$100\ \mu$ long and has 10–1000, preferably 20–500 of acicular ratio, under a microscope. If the symbols a and b are out of the scope defined above, electrical conductivity-providing ability per unit weight is lowered. If fiber is shorter than 1 $\mu$, it is very hard to form a uniform electrically conductive layer and to obtain desired electrical conductivity. If the fiber is longer than 1 mm, it is easily broken. If acicular ratio is less than 10, advantageous effect, i.e., an electrical circuit is able to form with a small amount of an electrically conductive material, disappears. If acicular ratio exceeds 1000, degradation is seen in disperability of the fibrous material in paper, plastics and rubber.

2–500, preferably 20–200 parts by weight of tin oxide are applied on 100 parts by weight of the fiber made from alkali titanate. If an amount of tin oxide is smaller than 2 parts by weight, it is very hard to keep good electrical conductivity. If an amount of tin oxide is larger than 500 parts by weight, it is not economical because no better electrical conductivity is obtained corresponding to an amount of coating applied.

Tin oxide may contain other compounds as long as they make no harm on an electrical conductivity-providing ability. The other compounds are, for example, Sb compounds. An amount of such compounds is 0.1-30, preferably 1-20 % by weight in terms of Sb, on the basis of tin oxide. Sb serves to improve an electrical conductivity-providing ability of tin oxide. Sb is in the oxide form. If an amount of Sb is smaller than 0.1 % by weight, no improvement is expected in an electrical conductivity-providing ability. A greater amount of Sb than 30 % by weight gives undesirable influence, because an electrically conductive material is colored in blue.

Any process is applied to coat a fiber made from an alkali titanate with a tin oxide material. One of processes is that the fiber is dispersed and suspended in a hot water (60°-90 ° C.), solution in alcohol containing specific amounts of tin chloride with or without antimony chloride is added to the suspension, a tin oxide material with or without antimony oxide produced by hydrolysis is precipitated on the fiber, and then the fiber is filtered, dried and calcined.

It is not certain why the present fibrous material in which a tin oxide material is coated on a fiber made from alkali titanate having the formula specified above is superior to a fiber made from the other metal oxide in respect to electrical conductivity-providing ability. Assumption is that alkali such as K contained in a fiber made from alkali titanate would be allowed to react with tin chloride, the initial form on precipitation, until strong bonding is produced. There is few peeling-off of a tin oxide material when the present fibrous material is blended as a filler. Furthermore, a fiber itself made from alkali titanate is so strong and highly elastic that there is few breakage of fiber. It is not certain, too why great difference is brought about in respect to electrical conductivity-providing ability, when the well known electrically conductive fibrous material is blended in resin, said material being made from alkali titanate having high mol ratio of $M_2O$ against $TiO_2$. Assumption is that alkali would be dissolved outfrom a fiber when heat-treatment is applied to, for example, in order to convert tin hydrate compound to tin oxide, until electrical conductivity of tin oxide would greatly be damaged.

The present white fibrous electrically conductive material is blended with a resin component in a coating composition in amounts of 5-90 parts by weight of the fibrous material, preferably 10-80 parts by weight of the fibrous material and 95-10 parts by weight of the resinous component, preferably 90-20 parts by weight of the resinous component, to make total of 100 parts by weight of the coating composition.

Any coating composition, for example, paint, may be used. The composition usually consists of, for example, a solvent such as alcohol, ester, ketone, ether and water and a resinous component such as acrylic, vinyl, carbonate, polyester, urethane, epoxy and polypropylene.

When an amount of the white fibrous electrically conductive material to be blended in the coating composition is smaller than that defined above, there is few electrical conductivity-providing ability. When an amount of the fibrous material is greater than that defined above, on the other hand, binding property of the resin component is lowered.

If desired, an anionic surfactant such as sodium dialkylsulfosuccinate, sodium alkylnapthalenesulfonate, etc., a cationic surfactant such as stearyltrimethyl ammonium chloride or an ester surfactant such as sorbitan monostearate may be added when a fibrous electrically conductive material is blended with a coating composition, e.g., paint, in order to improve dispersability of the fibrous material. Alternatively, the fibrous material is treated with a surfactant before the material is blended with a coating composition.

The present coating composition containing the white fibrous electrically conductive material above may be applied by any coating method, for example, spraying, a bar-coating method, a doctor blade method.

EXAMPLE 1

Fibers (15 $\mu$ long on an average, 353 g) made from potassium titanate (0.08 $K_2O.TiO_2$. 0.15 $H_2O$; acicular ratio = 50) were added to water (20 l) and then the water was heated to 70 ° C. Solution of $SnCl_4$ (620 g) in isobutanol (5 l) was added, with stirring, to the water over three hours, until a coating layer made from tin oxide precipitated was formed on the fibers. The fibers were filtered, washed with water and then treated in hot air (500 ° C.) for three hours in order to improve degree of crystallization of tin oxide. A white fibrous filler was obtained. Tin oxide content=45 % by weight. Electrical resistivity=$4 \times 10^3$ $\mu$ cm.

The filler was blended with urethane resin in such an amount that the filler is 50 % by weight of the urethane resin and a sheet (30 $\mu$ thick) was prepared. Volume resistivity of the sheet=$5 \times 10^6$ $\Omega$ cm. The filler was blended with acrylic resin so that the filler is 50% by weight of the acrylic resin and the blended mixture was applied (30 g/m² in terms of solid) on a cloth made from polyester. Surface resistance of the cloth=$3 \times 10^7$ $\Omega/\square$.

EXAMPLE 2

Fibers (15 $\mu$ long on an average; 353 g) made from potassium titanate (0.08 $K_2O.TiO_2$.0.15 $H_2O$; acicular ratio =50) were added to water (20 l) and then the water was heated on 70° C. To the water was added, with stirring, solution of $SnCl_4$ (520 g) and $SbCl_3$ (118 g) in isobutanol (5 l) over three hours, until a coating layer made from tin oxide precipitated containing antimony compounds was formed on the fibers. The fibers were filtered, washed with water and treated in hot air (500 ° C.) for three hours in order to improve degree of crystallization of the tin oxide. A white fibrous filler was obtained. Amounts of antimony in terms of Sb and tin oxide =8% by weight and 41% by weight, respectively. Electrical resistivity =20 $\Omega$cm.

The filler was blended with urethane resin so that the filler is 30% by weight of the urethane resin and a sheet (30 $\mu$ thick) was prepared. Volume resistivity of the sheet =200 $\Omega$ cm. The filler was blended with acrylic resin in such an amount that the filler is 30% by weight of the acrylic resin and the blended mixture was applied (30 g/m² in terms of solid) to a cloth made from polyester. Surface resistance of the cloth=$3 \times 10^6 \Omega/\square$.

EXAMPLE 3

Example 2 was repeated to obtain a white fibrous filler except that fibers (13 $\mu$ long on an average) made from potassium titanate (0.11 $K_2O.TiO_2$. 0.14 $H_2O$, acicular ratio=40) were used in place of the fibers described therein. Antimony in terms of Sb and tin oxide in the filler=8% and 41% by weight, respectively. Electrical resistivity=30 $\Omega$cm.

The filler was blended with urethane resin in such an amount that the filler is 30 % by weight of the urethane resin and a sheet (30 μ thick) was prepared. Volume resistivity of the sheet=400 Ω cm. The filler was blended with acrylic resin so that the filler is 30% by weight of the acrylic resin and then the blended mixture was applied (5 g/m² in terms of solid) to paper. Surface resistance of the paper=3×10⁷ Ω/□.

EXAMPLE 4

"Perex NBL" (Tradename, manufactured by Kao Sekken Co., Ltd.) (15 parts by weight) was added as a dispersant to the fibrous filler (100 parts by weight) obtained in example 2, and the mixture was stirred in a ball mill ( 1 l) for one hour. No change in acicular ratio was observed under a transmission electron microscope after mixing.

The filler (three parts by weight) was blended with a paint (urethane 7 parts by weight and toluene 35 parts by weight) to obtain white electrically conductive paint. The paint was applied (4 μ thick) to a substrate by a doctor blade. Surface resistance and other properties are shown in Table 1.

EXAMPLES 5-8

Electrically conductive fibrous materials having properties shown in Table 1 were prepared by the similar process to that in example 2. The fibrous materials were treated with dispersing agents shown in Table 1 to obtain paints. Properties are shown in Table 1.

EXAMPLE 9

Fibers (15 μ long on an average; 71 g) made from potassium titanate (0.08 $K_2O \cdot TiO_2 \cdot 0.15 H_2O$; acicular ratio=50) were added to water (1 l) and then the water was heated to 70 ° C. To the water was added, with stirring, solution of $SnCl_4$ (44 g) and $SbCl_3$ (5 g) in isopropanol (0.14 l) over three hours, until a coating layer made from tin oxide precipitated containing antimony compounds was formed on the fibers. The fibers were filtered, washed with water and treated in hot air (500 ° C.) for three hours in order to improve degree of crystallization of the tin oxide. A white fibrous filler was obtained. Amounts of antimony in terms of Sb and tin oxide=2.8 % by weight and 26 % by weight, respectively. Electrical resistivity =60Ωcm.

The filler was blended with urethane resin so that the filler is 30 % by weight of the urethane resin and a sheet (30 μ thick) was prepared. Volume resistivity of the sheet=340 Ω cm. The filler was blended with acrylic resin in such an amount that the filler is 30 % by weight of the acrylic resin and the blended mixture was applied (30 g/m² in terms of solid) to a cloth made from polyester. Surface resistance of the cloth=7×10⁶ Ω/□.

COMPARATIVE EXAMPLE 1

Example 1 was repeated except that fibers (15 μ long on an average) made from potassium titanate (0.16 $K_2OTiO_2 \cdot 0.5H_2O$, acicular ratio =50) were used in place of the fibers therein, to obtain white fibrous filler. Tin oxide=48 % by weight. Electrical resistivity =7×10⁶Ωcm.

The filler was blended with urethane resin in such an amount that the filler is 50 % by weight of the urethane resin, and a sheet (30 μ thick) was prepared. Volume resistivity of the sheet =8×10⁹Ω cm. The filler was blended with acrylic resin in such an amount that the filler is 50 % by weight of the acrylic resin, and the blended mixture was applied (30 g/m² in terms of solid) to a cloth made from polyester. Surface resistance of the cloth=5×10⁵ Ω/□.

COMPARATIVE EXAMPLE 2

Example 2 was repeated except that fibers (15 μ long on an average, BET specific surface area =10 m²/g) made from titania (acicular ratio =40) in place of the fibers used therein, to obtain white fibrous filler. Antimony and tin oxide=8 % by weight in terms of Sb and 38 % by weight, respectively. Electrical resistivity=150 Ω cm.

The filler was blended with urethane resin in such an amount that the filler is 30 % by weight of the urethane resin, and a sheet (30 μ thick) was prepared. Volume resistivity=1×10⁴ Ω cm.

COMPARATIVE EXAMPLE 3

Titania powder (BET specific surface area=5 m²/g, 30 g) was added to water (0.8 l) and the water was heated to 90° C. To the water was added, with stirring, solution of $SnCl_4$ (75 g) and $SbCl_3$ (17 g) in isobutanol (0.2 l) over three hours, until a coating of tin oxide precipitated containing Sb was formed on the powder. The powder was filtered, washed with water and treated in hot air (500° C.) for three hours to produce white powdery filler. Specific resistivity =5 Ω cm.

The filler was blended with urethane resin so that the filler is 30% or 60% by weight of the urethane resin, and sheets (30 μ thick each) were prepared. Volume resistivities =1×10¹² Ω cm for the former and 1×10⁶ Ω cm for the latter.

COMPARATIVE EXAMPLE 4

Example 2 was repeated except that no fiber made from potassium titanate mentioned therein was used, to obtain dark blue tin oxide power containing antimony. Electrical resistivity of the powder=1 Ω cm.

The powder was blended with urethane resin so that the powder is 30 % by weight of the urethane resin, and a sheet (30 μ thick) was prepared. Volume resistivity of the sheet=1×10¹² Ω cm.

COMPARATIVE EXAMPLE 5

"Tween 85" (trade name), a condensation product of sorbitan ester of trioleic acid with polyethylene oxide, was dissolved in water (5 l). The solution was separated into two solutions in equal volume. In one of the solutions was dissolved ammonium oxalate (23 g). In the other solution was dissolved $SnCl_2$ (19 g). The two solutions were mixed at a time and the mixed solution was stirred slowly for five hours at room temperature. Tin oxalate in a needed shape precipitated was filtered, washed with water and then ethanol, dried in air (80 ° C.) for six hours and heated at 600 ° C. for one hour to obtain tin oxide in a needed shape.

To the tin oxide (10 g) was added solution of antimony trichloride (0.1 g) in ethanol (10 g). The mixture was well mixed in a mortar and then ethanol was evaporated under heating. The mixture was heated at 600 ° C. for one hour to obtain blue fibrous tin oxide filler (20 μ long on an average; acicular ratio =20) containing antimony. Resistivity =10 Ω cm.

The filler was blended with acrylic resin in such an amount that the filler is 30% by weight of the acrylic resin, and then the resin was applied (5 g/m² in terms of solid) to paper. Surface resistance of the paper=2×10⁸ Ω/□.

COMPARATIVE EXAMPLE 6

TABLE 1

| | fibrous electrically conductive material (A) | | | | | | | pretreatment | |
|---|---|---|---|---|---|---|---|---|---|
| | fiber base | | | coating material | | Coating/ | resist- | | digesting |
| | chemical composition | length (μ) | acicular ratio | SnO₂ (%) | Sb (%) | base (%) | ivity (Ωcm) | Surfactant | period (hr) |
| Example 4 | potassium titanate (0.08K₂O.TiO₂.0.15H₂O) | 15 | 50 | 80.2 | 15.7 | 104 | 20 | Perex NBL | 1 |
| Example 5 | potassium titanate (0.08K₂O.TiO₂.0.15H₂O) | 15 | 50 | 80.2 | 15.7 | 104 | 20 | — | — |
| Example 6 | potassium titanate (0.08K₂O.TiO₂.0.15H₂O) | 15 | 50 | 80.2 | 15.7 | 104 | 20 | Perex NBL | 1 |
| Example 7 | potassium titanate (0.08K₂O.TiO₂.0.15H₂O) | 15 | 50 | 87.7 | 9.7 | 42 | 95 | Perex NBL | 1 |
| Example 8 | potassium titanate (0.11K₂O.TiO₂.0.14H₂O) | 13 | 40 | 80.2 | 15.7 | 104 | 30 | Perex NBL | 1 |
| Comparative example 7 | titania powder | 0.5 | 1 | 80.2 | 15.7 | 104 | 5 | Perex NBL | 1 |

| | blending ratio (parts by weight) | | | | | coated film | | |
|---|---|---|---|---|---|---|---|---|
| | electrically conductive fiber | resin | | solvent | | thickness (μ) | surface resistance (Ω/□) | brightness by Hunter (%) |
| | | variety | amount (past) | variety | amount (past) | | | |
| Example 4 | 3 | urethane | 7 | toluene | 35 | 4 | $4 \times 10^5$ | 56 |
| Example 5 | 3 | urethane | 7 | toluene | 35 | 4 | $5 \times 10^5$ | 55 |
| Example 6 | 4 | acrylic | 6 | toluene | 15 | 4 | $1.5 \times 10^6$ | 58 |
| Example 7 | 4 | alkyd | 6 | toluene | 20 | 4 | $1.2 \times 10^7$ | 65 |
| Example 8 | 3 | urethane | 7 | toluene | 35 | 4 | $1 \times 10^6$ | 56 |
| Comparative example 7 | 4 | urethane | 6 | toluene | 35 | 4 | $2.5 \times 10^9$ | 56 |

Example 2 was repeated except that commercial fiber made from potassium titanate (0.16 $K_2O.TiO_2.0.5\ H_2O$) was used in place of the fiber mentioned therein, to obtain fibrous filler. Antimony in terms of Sb and tin oxide=8% by weight and 42% by weight, respectively. Electrical resistivity=150 Ω cm.

The filler was blended with urethane resin so that the filler is 30% by weight of the urethane resin and a sheet (30 μ thick) was prepared. Volume resistivity=$1 \times 10^4$ Ω cm.

COMPARATIVE EXAMPLE 7

Example 2 was repeated except that fiber (the same length as in Example 2) made of potassium titanate (0.13 $K_2O.TiO_2.6\ H_2O$; the same acicular ratio as in example 2) was used in place of the fiber mentioned therein, to obtain fibrous filler. Antimony in terms of Sb and tin oxide=8 % by weight and 43 % by weight, respectively. Electrical resistivity=530Ω cm.

The filler was blended with urethane resin in such an amount that the filler is 30% by weight of the urethane resin, and a sheet (30 + thick) was prepared. Volume resistivity=$1.5 \times 10^3$ Ω cm.

As stated above, the present white fibrous tin oxide electrically conductive material has low volume resistivity. Filler made from the present fibrous material has remarkably greater electrical conductivity-providing ability per unit weight than electrically conductive filler which is commercially available made from flaky tin oxide and that in which such metal oxide powder as alumina, titania or silica is coated with a tin oxide electrically conductive material.

Furthermore, so is the filler made from the present fibrous material when compared with filler prepared by coating glass fibers, alumina fibers, titania fibers, silica fibers or potassium titanate fibers in which ratio of potassium to $TiO_2$ is greater than the present (symbol a) with tin oxide. A coating composition containing the present fibrous electrically conductive material has remarkably greater electrical conductivity than that containing any of the other fibrous electrically conductive materials.

We claim:

1. A fibrous white electrically conductive material which comprises a fiber made from alkali titanate having the formula:

$$aM_2O.TiO_2.bH_2O$$

wherein M is alkali metal selected from the group consisting of Li, Na and K, $$0 < a \leq 1/8.5 \text{ and}$$

$$0 \leq b \leq 6$$

which is coated by 2–500 parts by weight of tin oxide every 100 parts by weight of the fiber.

2. A fibrous material according to claim 1 wherein the symbol a of the formula satisfies $1/13 \leq a \leq 1/9$ and the symbol b of the formula $0 \leq b \leq 6$.

3. A fibrous material according to claim 1 wherein the tin oxide contains antimony in such an amount of 0.1–30 % by weight in terms of Sb on the basis of the tin oxide.

4. A fibrous material according to claim 1 wherein the symbol M of the formula is K.

5. A fibrous material according to claim 1 wherein the fiber of alkali titanate is 1 μ−1000μ long and has 10–1000 of acicular ratio.

6. A white electrically conductive coating composition which comprises, every 100 parts by weight thereof, 5–90 parts by weight of a fibrous white electrically conductive material and 95–10 parts by weight of a resinous material, said fibrous material comprising a fiber made from alkali titanate having the formula:

$$am_2O.TiO_2.bH_2O$$

wherein M is alkali metal selected from the group consisting of Li, Na and K, $0 < a \leq 1/8.5$ and
$0 \leq b$, which is coated by 2–500 parts by weight of tin oxide every 100 parts by weight of the fiber.

7. A coating composition according to claim 6 wherein the symbol a of the formula satisfies $1/13 \leq a \leq 1/9$ and the symbol b of the formula $0 \leq b \leq 6$.

8. A coating composition according to claim 6 wherein the tin oxide contains antimony in such an amount of 0.1–30 % by weight in terms of Sb on the basis of the tin oxide.

9. A coating composition according to claim 6 wherein the symbol M of the formula is K.

10. A coating composition according to claim 6 wherein the fiber of alkali titanate is 1 $\mu$–1000 $\mu$ mm long and has 10–1000 of acicular ratio.

* * * * *